Nov. 3, 1959     D. B. BROUGHTON     2,911,452
PROCESS FOR SEPARATING BUTYLENES FROM BUTANES
Filed June 22, 1956
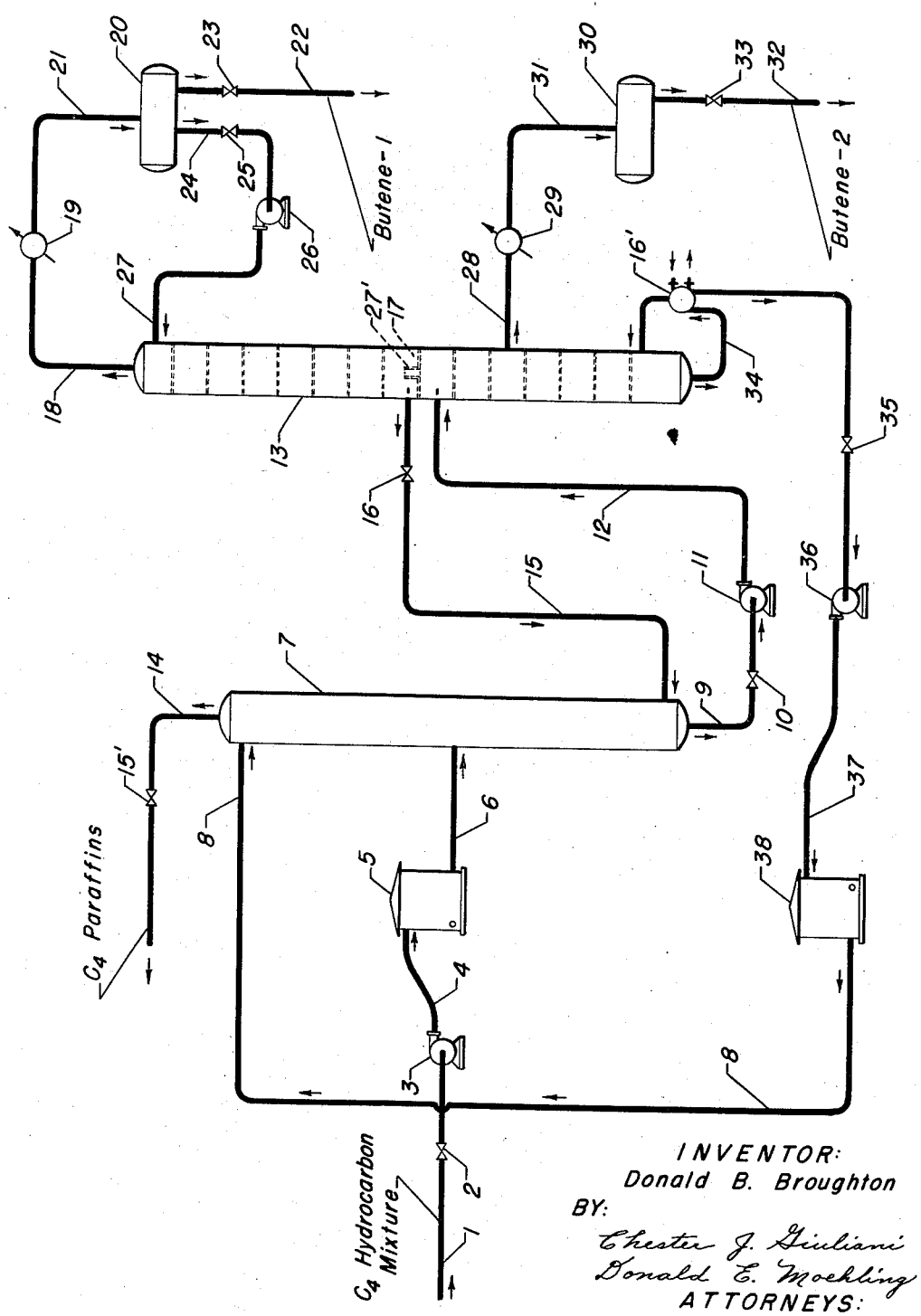
INVENTOR:
Donald B. Broughton
BY:
Chester J. Giuliani
Donald E. Moehling
ATTORNEYS:

United States Patent Office 2,911,452
Patented Nov. 3, 1959

2,911,452

PROCESS FOR SEPARATING BUTYLENES FROM BUTANES

Donald B. Broughton, Chicago, Ill., assignor, by mesne assignments, to Universal Oil Products Company, Des Plaines, Ill., a corporation of Delaware Application June 22, 1956, Serial No. 593,101

7 Claims. (Cl. 260—677)

This invention relates to a process for separating substantially pure butene-1 from hydrocarbon mixtures comprising butanes and cis- and trans-2-butenes, said process being capable of segregating a mixture of said hydrocarbons of the $C_4$ series into a substantially pure butene-1 fraction, a fraction consisting of butanes and a fraction consisting of butene-2. More specifically, the invention concerns a combination solvent extraction and fractional distillation process of specific flow arrangement, whereby advantage is taken of the differences in volatility between the above indicated fractions in the presence and absence of a solvent, coupled with the differences in solubility of liquid $C_4$ paraffins and $C_4$ olefins in selective solvents.

One object of the invention is to separate a hydrocarbon mixture comprising $C_4$ paraffins and $C_4$ olefins into relatively pure product fractions consisting predominantly of the foregoing types of hydrocarbons. Another object of the invention is to provide a process for separating $C_4$ hydrocarbon mixtures into separate fractions, each of substantial purity, including (1) n-butane, (2) butene-1 and (3) butene-2. Still another object of the invention is to provide an economical and highly effective method for separating $C_4$ olefins from $C_4$ paraffins and for separating butene-1 from butene-2 isomers.

In one of its embodiments the present invention relates to a process for separating a $C_4$ hydrocarbon mixture comprising a $C_4$ paraffin, butene-1 and butene-2 which comprises contacting in liquid phase at solvent extraction conditions said mixture with a solvent in which $C_4$ olefinic hydrocarbons are selectively soluble and which boils at a temperature substantially above the boiling point of said mixture, separating an extract comprising said solvent containing dissolved $C_4$ olefin from a raffinate enriched with respect to $C_4$ paraffins, subjecting said extract to conditions of pressure and temperature suitable to effect substantially complete vaporization of the butene-1 and butane components of the hydrocarbon solute from a resulting partially stripped extract, fractionally distilling in the substantial absence of the solvent, the hydrocarbon vapors thus produced, removing at least a portion of the most volatile portion comprising butene-1 of the overhead vapor fraction, separately distilling said partially stripped extract and fractionally distilling the resulting vapors in the presence of said solvent, separating a relatively volatile fraction containing butene-2 from said stripped extract, and recycling the resulting solvent residue to said contacting step.

Another embodiment of the invention concerns the method of separation hereinabove described, further characterized in that the bottoms of said overhead vapor fraction are recycled at least in part to the contacting step and introduced therein between the feed stock inlet and the extract outlet.

The hydrocarbon mixture utilized as feed stock in the present process is a mixture of olefins and paraffins containing 4 carbon atoms per molecule which may be derived from any suitable source, such as the appropriately boiling fraction of the light condensable gases of a catalytic or thermal cracking process, as the product mixture of a butane dehydrogenation process containing the various butylene isomers in admixture with normal and isobutane, as a fraction of a Fischer-Tropsch reaction product in which carbon monoxide is condensed with hydrogen to form, among other types and classes of organic compounds, hydrocarbons of various molecular weights, including $C_4$ olefins and paraffins, as a light, condensable fraction of the products of dehydrogenation and reforming processes utilizing petroleum charging stocks, as the dehydration product of normal and isobutyl alcohol and from numerous other sources well known to the art. The $C_4$ hydrocarbons generally exist in the form of mixtures of olefins and paraffins containing 4 carbon atoms per molecule and includes one or more of the following hydrocarbon species: n-butane, isobutane, butene-1, isobutylene, and butene-2, including both the cis- and trans-modifications of butene-2. Because of the close proximity of their boiling points, these isomers and analogs cannot be readily separated into pure fractions exclusive of the others in the same mixture. Many processes have heretofore been proposed for separating the olefin and paraffin $C_4$ analogs, most of these processes depending upon differences in the chemical reactivities and the differences in solubilities of these olefins and paraffins in special solvents. The processes of the prior art which depends upon differences in solubility in various solvents require the use of extensive extraction equipment and many more theoretical stages than is theoretically required to effect the separation on the basis of the differences in the boiling points of the components in the mixture. In other instances the $C_4$ feed stock to the separation process is separated into impure fractions which may contain only from about 75 to 95% of the particular analog or isomer desired because of the aforementioned solubility and volatility relationships between the $C_4$ components to be separated. The $C_4$ hydrocarbon mixture utilized as feed stock may contain any proportion of olefinic and paraffinic components and any proportion of analogs of each class of hydrocarbons, the present method being operable in case of charge stocks containing high or low proportions of olefinic constituents.

The solvents utilizable in the present extraction process are selected from the organic compounds which, in general, are selectively miscible with the unsaturated components of the hydrocarbon mixture and which do not appreciably dissolve the paraffinic components; that is, the present solvent dissolves a greater proportion of butenes than it does butanes. Illustrative specific organic compounds useful as selective solvents and having a selective solvent action for the butylene components of the hydrocarbon feed stocks include the alcohols, such as methanol, ethanol and higher homologous monohydric alcohols, generally up to and including octanol and its isomers; the glycols, such as ethylene glycol, propylene glycol, butylene glycol, and amylene glycol, trimethylene carbinol, glycerol, etc.; phenols such as phenol itself, one or more of the cresols and xylenols, such as ortho-, meta-, or para-methylphenol, 3,5-dimethylphenol, 2,6-dimethylphenol, etc., alpha-naphthol, beta-naphthol, etc.; ethers such as di-isopropyl ether, di-n-butyl ether, diisoamyl ether etc.; the glycol-ethers, such as diethylene glycol, dipropylene glycol, dimethyl ether of ethylene glycol, triethylene glycol, tripropylene glycol, $\alpha,\alpha'$-dihydroxy ethylpropyl ether, methylphenolate, etc.; nitriles such as $\beta,\beta'$-oxydipropionitrile; esters such as glycol diacetate etc.; ketones, such as acetone, methylethyl ketone, diethyl ketone, phenylmethyl ketone, diphenyl ketone, di-isopropyl ketone and other members of the aliphatic ketone series; aldehydes such as acetaldehyde, propionaldehyde, butrylaldehyde, isobutrylaldehyde, valeraldehyde, benzaldehyde, cinnamaldehyde; and other organic solvents having selective solubilizing properties for olefinic hydrocarbons in the presence of paraffins. One of the preferred classes of solvents for the present butene extraction process, particularly suitable for the recovery of high purity butene extracts are the alcohols and ketones of relatively low molecular weight such as acetone, methylethyl ketone, diethyl ketone, and alcohols such as methanol and ethanol, as well as the glycol ethers such as diethylene glycol, dipropylene glycol, mixtures of diethylene and dipropylene glycol, triethylene glycol, and other polyoxy alkylene glycols, preferably modified in their solvency and selectivity characteristics by the inclusion of from about 2% to about 50% by weight of water in the solvent mixture. The presence of water in the solvent is particularly useful as a modifying agent in such water-soluble solvents as the alcohols, ketones and aldehydes. Thus, for example, aqueous methanol solutions containing from 5% to about 50% by weight of water, aqueous acetone solutions containing from 10% to about 50% by weight of water and ethylene glycol and diethylene glycol solutions containing from 2 to 25% by weight of water are particularly noteworthy examples of useful solvents in the present process.

The operation of the present process and its effectiveness as a means of preparing substantially pure product streams of butene-1, normal butane, and butene-2 depend upon certain relationships between the volatilities of these components present in the hydrocarbon feed stock mixture in the presence and absence of the solvent and the relative solubilities of the components in their liquid state in the solvent. The following table indicates these relationships, based upon actual observations of the volatilities and solubilities of the indicated components with respect to typical, organic solvent-type compounds, the numerical values for these factors being substantially constant with respect to a wide variety of compounds commonly utilized as selective solvents.

Table I

|   | Relative Volatility in Absence of Solvent | Relative Volatility in Presence of Solvent | Relative Solubility of Liquid Hcn. in Solvent |
|---|---|---|---|
| Butene-1 | 1.230 | 0.850 | 1.492 |
| N-Butane | 1.000 | 1.000 | 1.000 |
| Butene-2 (Trans) | 0.970 | 0.590 | 1.643 |
| Butene-2 (Cis) | 0.893 | 0.528 | 1.692 |

It will be evident from inspection of the data in the above Table I that the difference in selectivity of the solvent for the various components of the hydrocarbon mixture is relatively slight, such that processes for separating butylenes from butanes utilizing conventional liquid-liquid extraction techniques require a large number of theoretical contact stages in order to obtain reasonable purification of the butylene and butane streams, principally because of the low degree of selectivity of the solvent for the butylene component. Furthermore, on the basis of the experience of the art in the design of liquid-liquid extraction processes, the difficulty of obtaining a large number of theoretical contact stages and the difficulty of designing an extraction column for such a process is well-known and widely recognized in the art. The provision of suitable apparatus for effecting such a separation based merely upon the principles of solvent extraction requires the use of enormous equipment of costly design and operation to produce a product of substantial purity at a reasonable commercial rate of production.

In vapor-liquid or extractive distillation types of extraction processes, the separation of butanes from butylenes is handicapped by the fact that the extractive effect of the solvent opposes the volatility differences between the butenes and butanes, as will be evident from an inspection of the data in the above Table I. Indeed, the data concerning the relative volatilities of n-butane and 1-butene indicate that the vapor-liquid separation of these hydrocarbons is more readily accomplished in the absence of the solvent. Accordingly, it has been customary in the prior art to separate 1-butene from the other components of the $C_4$ hydrocarbon mixture in a preliminary separation by simple fractional distillation and thereafter subjecting the remaining portion of the mixture to an extractive distillation type of separation process to thereby separate n-butane from the butene-2 components of the mixture. It is obvious that in such a proposed method of separation, as the experience of the prior art will substantiate, the equipment requirements and the cost of providing such equipment is relatively high, because of the duplication of equipment required for effecting both the fractional distillation and extractive distillation stages of the process in separate units.

In the process provided by the present invention, on the other hand, duplication of the equipment is eliminated and the provision of a simple flow arrangement is one of the principal features of the process. Furthermore, even though the present method involves a greater reduction in the size and number of units of equipment required, the process is capable of producing a n-butane product, a butene-1 stream and a mixed trans- and cis-butene-2 product stream of high purity. The present process employs a combination of liquid-liquid extraction in a primary stage of the process, extractive distillation of the resulting rich solvent in an intermediate stage and rectification of the light hydrocarbons distilled from the rich solvent as an integral portion of the rectification zone.

The present invention is further described by reference to the accompanying diagram which illustrates a particular means for effecting the present separation process and is thus illustrative of merely one of several methods of operating the process. For purposes of illustration and to simplify the description of the process, the diagram will be described with respect to specific conditions of temperature, pressure, solvent to feed ratios and other process factors involved in the separation. Thus, a $C_4$ hydrocarbon feed stock comprising n-butane, butene-1 and the butene-2 isomers, namely: cis-butene-2 and trans-butene-2 is charged into the process flow through line 1 in amounts controlled by valve 2, the feed stock being compressed sufficiently to liquefy the normally gaseous hydrocarbons by means of pump 3, the liquefied $C_4$ fraction being discharged at a pressure, for example, of from about 10 to about 50 atmospheres through line 4 into heat exchanger 5 which may either cool or heat the liquefied $C_4$ fraction, depending upon the desired operating temperature in the subsequent stages of the process. For purposes of illustration, the liquefied $C_4$ fraction, at a super-atmospheric pressure, such as 20 atmospheres, is heated to a temperature within the range of from about 5° to about 65° C. and preferably to a temperature of about 30° C. when operating the process at a pressure of 20 atmospheres, the resulting liquefied $C_4$ feed stock being charged through line 6 into countercurrent liquid-liquid extraction column 7, preferably at a point between the raffinate and rich solvent outlets from the column and below the point at which the lean solvent or extractant is charged therein. Extraction column 7 is designed to provide maximum contact between the $C_4$ feed stock and the liquid solvent flowing into the top of the column through line 8, the solvent being the lean, or regenerated solvent recovered from the stripping stage of the present process, as hereinafter described. One of the preferred solvents for use herein is a material which boils at a higher temperature relative to the boiling point of the $C_4$ feed stock, including such solvents as methanol, acetone or other one-component or multi-component solvent mixtures comprising compounds hereinabove described. One of the preferred solvents for effecting the present separation is an aqueous solution of methanol, containing from about 2% to about 30% by weight of water, preferably from about 5% to about 15% by weight thereof. Typical process conditions utilizable in the countercurrent liquid-liquid contacting process to accomplish the desired separation between the $C_4$ olefin isomers is a hydrocarbon to solvent feed ratio of from about 0.1 to 1 to about 5 to 1 on a volumetric basis. Although most solvents of the type hereinabove indicated, particularly most solvents within the general class of oxygen-containing organic compounds, are of substantially similar effectiveness as selective solvents for olefinic hydrocarbons at specified water concentrations. For the present illustration, utilizing an aqueous methanol solution containing approximately 10% by weight of water, a solvent to feed ratio of 3 to 1 is especially suitable, when utilizing an operating temperature of 30° C. and a pressure of 10 atmospheres for the particular operation.

Extraction column 7 may be of any suitable design sufficient to obtain countercurrent, liquid-liquid contact between the hydrocarbon and solvent feeds, including columns packed with contacting materials such as quartz chips, Berl saddles, ceramic helices and other packing materials well-known in the art, as well as bubble cap and tray columns, sieve deck columns and other designs and types well-known in the prior art for countercurrent liquid-liquid contact.

The solvent, in general, has a greater selective solubility for $C_4$ olefins than for their corresponding paraffin analogs and the rich solvent stream, enriched with the olefin components of the feed stock, and being the phase of highest specific gravity present within the extraction column, will tend to accumulate in the lower portion of the column and can be removed therefrom through line 9 at a rate of flow controlled by valve 10, being thereafter conveyed by means of pump 11 into line 12 which directs the rich solvent stream into distillation column 13 wherein the hydrocarbons dissolved in the solvent are separated in accordance with the methods of this invention, as hereinafter described. The paraffinic hydrocarbons present in the $C_4$ feed stock which are less readily soluble in the solvent than the $C_4$ olefins tend to flow in an upward direction within extraction column 7 from the point at which they are introduced into the column. They may be removed as a substantially pure $C_4$ paraffinic raffinate phase from the top of the column through line 14 at a rate of flow determined by valve 15', preferably being removed from the process flow and recycled to a dehydrogenation reaction zone for further conversion of the $C_4$ paraffins into olefinic materials or for other disposition from the process.

A reflux stream comprising a mixture of $C_4$ paraffins and olefins recovered from stripping column 13, as hereinafter indicated, and containing a relatively high proportion of olefinic components relative to paraffins is introduced into the lower portion of countercurrent extraction column 7 to selectively displace paraffinic hydrocarbons from the rich solvent stream prior to the removal of the latter stream from the extraction column. The olefin-enriched reflux may be introduced into column 7 at any point below the feed inlet, but is preferably charged into the column at its lowermost level in order to realize as great a degree of countercurrent contact between the reflux stream and the rich stream as possible. Thus, in the process illustrated, the reflux stream is introduced into column 7 through line 15 at a rate of flow determined by valve 16.

It will be evident from the nature of the present solvent extraction process that the function of countercurrent contact column 7 is to remove $C_4$ olefins from the raffinate but not necessarily to produce a rich solvent stream containing a high proportion of butylenes to total $C_4$ solute.

The separation of dissolved butylenes from dissolved butanes, both present in the rich solvent stream, is accomplished in stripping column 13 wherein special fractional distillation and extractive distillation effects are realized, as will be made more apparent in the description which follows. Stripping column 13 is of special design in order to accomplish the desired separation herein provided. Its construction is of such type that efficient liquid-vapor contact is realized throughout the column in order to effect the separation of vaporized and liquefied components as efficiently as possible. Column 13 contains a reboiler 16' in its lowermost portion wherein heat in sufficient quantity to effect the desired vaporization of hydrocarbons from the liquid phases present therein and thereby realize fractionation of the hydrocarbon components is introduced into the liquid rich solvent phase accumulating in the lower portion of the column. The rich solvent from extraction column 7 is charged into stripping column 13 at a point substantially below the overhead vapor draw-off, but also substantially above the reboiling section and in the preferred form of column 13 the rich solvent is introduced on a plate corresponding approximately to the mid-point of the column. Above the rich solvent inlet to column 13 is a perforated plate 17 constructed in the form of a liquid retaining well comprising a horizontal tray containing one or more open-ended riser tubes projecting upwardly from corresponding perforations in the tray into the hydrocarbon fractionation section, each riser being of sufficient height to accumulate a liquid layer on the upper surface of the horizontal tray to a level above the liquid reflux draw-off line 15, heretofore described. Since the solvent is a material having a boiling point greater than the boiling point of the feed stock and sufficiently greater that it has no appreciable vapor pressure at the temperature at which the hydrocarbon solute is distilled from the rich solvent stream, the solvent is retained within stripping column 13 below the liquid hydrocarbon retaining well 17 and substantially none of the solvent is vaporized into the upper portion of the column, above liquid hydrocarbon well 17. Thus, the portion of the column above liquid retaining well 17 serves as a fractional distillation or rectification zone in which no solvent is present and the section of the column below well 17 serves as a distillation zone in which the hydrocarbons are distilled in the presence of a solvent; that is, an extractive distillation section.

The rich solvent stream entering the column from extractor 7 on the plate immediately below liquid retaining well 17 is subjected to temperature and pressure conditions which effect vaporization of the most volatile hydrocarbon present within the rich solvent stream. In accordance with the observed relative volatilities of indicated $C_4$ hydrocarbons in the presence of a solvent, 1-butene and the butanes are of substantially greater volatility than the 2-butenes when distilled from the rich solvent, such that the vapors flashed from the rich solvent below retaining well 17 are substantially enriched in butene-1 and butanes and the solvent residue in the stripping section of the column is enriched in butene-2. Although a large proportion of the butanes have been removed from the process flow as raffinate from the top of extraction column 7 prior to the introduction of the rich solvent stream into the stripping zone of column 13, the rich solvent nevertheless contains some butanes dissolved therein. Since the butanes are the most volatile $C_4$ hydrocarbon when distilled in the presence of the solvent, the material vaporized into the upper section of zone 13, therefore, will be relatively rich in butene-1 and butanes and relatively poor in butene-2. As indicated further in the preceding Table I, butene-1 is relatively more volatile in the absence of the solvent than the butanes and the upper rectifying section of column 13 (substantially free of solvent) thus accomplishes an enrichment of the hydrocarbon vapors in butene-1. The net rectified vapor (consisting of substantially pure butene-1) is removed as overhead from column 13 through line 18, condensed to a liquid condensate in cooler 19, and the condensed vapor run into receiver vessel 20 through line 21. The resulting butene-1 product is removed from receiver vessel 20 through line 22 in amounts controlled by valve 23 as one of the principal products of the process.

In order to accomplish the desired rectification in the upper section of column 13, a liquid reflux, consisting of condensate accumulating in receiver 20 is returned to the upper plate of column 13, at a rate sufficient to establish a reflux ratio of from about 0.5 to 1 to about 10 to 1, preferably a ratio of about 5 to 1, the reflux being returned to column 13 through line 24 in amounts sufficient to provide the desired reflux ratio, as determined by valve 25, by means of pump 26 which transfers the liquid reflux into line 27 emptying onto the upper plate or into the uppermost section of the column.

The butanes distilled with butene-1 from the rich solvent in the lower, stripping section of column 13, and which are distilled in the upper, rectification section of the column accumulate as a liquid bottoms in retaining well 17, being enriched with respect to said butanes because of the lesser volatility of the latter $C_4$ components than butene-1 in the absence of the solvent (q.v. in Table I). The resulting residue is withdrawn through line 15 and valve 16, as heretofore described, and returned as reflux into column 7 wherein any butenes present in the rectified bottoms effect selective displacement of butanes from the rich solvent stream into the raffinate in column 7 prior to discharge of the rich solvent into column 7.

At least a portion of the butene-2 solute present in the rich solvent stream introduced through line 12 into column 13 below retaining well 17 remains dissolved in the liquid solvent, together with some of the butene-1 component incompletely vaporized at its point of entry into column 13. As the rich solvent residue flows into the reboiling section of the column, the hydrocarbon solute is completely vaporized therefrom and the vapors rise through the column in countercurrent flow arrangement to the descending solvent stream flowing downwardly from the rich solvent inlet point. The resulting complete vaporization of hydrocarbon solute from the rich solvent in the reboiling section of the column and the contact of the resulting rising vapors with the solvent stream flowing downwardly in the column provides an extractive distillation type of contact between the solvent and hydrocarbon vapors, resulting in the vaporization of all of the butene-1 into the solvent-free hydrocarbon fractional distillation zone above retaining well 17 and a concentration of butene-2 components in the extractive distillation section. The hydrocarbon vapors distilled from the rich solvent and consisting predominantly of butene-1 enter the rectification section of the column through one or more of the stand pipes in retaining well 17 such as riser 27'. Butene-2 comprising both the cis- and trans-isomers is removed as a liquid stream in substantially pure form by withdrawing the same from column 13 through line 28, the vapors being cooled and condensed by transfer from line 28 into condenser 29. The product condensate consisting of substantially pure butene-2 isomers is thereafter drained through line 31 into receiver 30 from which it may be removed through line 32 in amounts controlled by valve 33.

The solvent residue accumulating in the lower portion of zone 13 and from which all of the hydrocarbon solute has been vaporized in reboiler 16, comprises regenerated or lean solvent which may be recycled to the extraction column as fresh solvent therein. For this purpose, the lean solvent is removed from column 13 as residue through line 34 in controlled amounts determined by valve 35 and transferred by means of pump 36 into line 37 leading into heat exchanger 38 wherein the temperature of the lean solvent is adjusted to correspond to the temperature desired in extraction zone 7 prior to discharge into line 8 which carries the solvent into the upper section of extraction zone 7, as heretofore described. Prior to its recycle to zone 7, the lean solvent stream may have its composition adjusted (such as the concentration of water contained in the methanol solvent) to provide the optimum composition desired for use as an extractive solvent in zone 7. For this purpose and to permit the addition of water to the solvent on a continuous basis, a water inlet may be provided in line 8 or 37 (not illustrated) for such readjustment of the solvent composition.

By virtue of the above described combined solvent extraction and stripping process a product stream consisting essentially of butanes may be recovered from solvent extraction column 7 as raffinate, a product stream consisting essentially of butene-1 may be recovered as vapor overhead from the hydrocarbon rectification section of stripping zone 13 and a product stream consisting essentially of butene-2 may be recovered as a side stream from the solvent extraction section of zone 13 at rates determined by the rate of feeding the charge stock, the size of the apparatus and the solvent to feed ratio utilized in the process.

I claim as my invention:

1. A process for recovering substantially pure butane, butene-1 and butene-2 from a $C_4$ hydrocarbon fraction containing the same which comprises contacting said fraction in liquid phase with a selective solvent for $C_4$ olefins having a substantially higher boiling point than said fraction, separating an undissolved $C_4$ paraffin raffinate from an extract comprising the solvent containing dissolved butenes and butane, subjecting said extract to extractive distillation to vaporize the $C_4$ hydrocarbons from the solvent in a distilling zone wherein the vapors are countercurrently contacted with the solvent, separating butene-2 from butene-1 and butane vapors in said zone and removing the same from an intermediate point in the height of the distilling zone, passing the butene-1 and butane vapors from the uppermost portion of said zone to a rectifying zone, fractionating the vapors in the latter zone in the absence of solvent to condense and separate from butene-1 vapors a liquid bottoms comprising substantially all of the butane present in said extract, removing said bottoms from the lower portion and the uncondensed butene-1 vapors from the upper portion of the rectifying zone, withdrawing stripped solvent from the lower portion of said distilling zone and returning the same to the first-mentioned contacting step.

2. The process of claim 1 further characterized in that said liquid bottoms is recycled to the contacting step and mixed with the solvent therein at a point between the $C_4$ mixture inlet and the extract outlet from said contacting step.

3. The process of claim 1 further characterized in that said $C_4$ hydrocarbon fraction is contacted with said solvent at a temperature of from about 5° to about 65° C. and at a pressure sufficient to maintain said $C_4$ hydrocarbon fraction in substantially liquid phase.

4. The process of claim 1 further characterized in that said solvent is an oxygen-containing organic compound having a selective solubility for $C_4$ olefins.

5. The process of claim 4 further characterized in that said oxygen-containing organic solvent is acetone.

6. The process of claim 4 further characterized in that said oxygen-containing organic solvent is methanol.

7. The process of claim 6 further characterized in that said solvent is an aqueous methanol containing from 2 to 30% by weight of water.

References Cited in the file of this patent

UNITED STATES PATENTS

| | | |
|---|---|---|
| 1,875,311 | Voorhees et al. | Aug. 30, 1932 |
| 2,211,747 | Goldsby et al. | Aug. 13, 1940 |
| 2,363,903 | Smith | Nov. 28, 1944 |
| 2,386,310 | Hachmuth | Oct. 9, 1945 |
| 2,415,921 | Wagner | Feb. 18, 1947 |
| 2,421,229 | Zimmerman | May 27, 1947 |
| 2,449,610 | Long | Sept. 21, 1948 |
| 2,484,305 | Mayland et al. | Oct. 11, 1949 |